(12) United States Patent
Lai et al.

(10) Patent No.: US 8,587,854 B2
(45) Date of Patent: Nov. 19, 2013

(54) APERTURE ADJUSTING DEVICE

(75) Inventors: Tu Fa Lai, Taoyuan Hsien (TW); Chia Ping Chan, Taoyuan Hsien (TW)

(73) Assignees: Preoptix (Jiangsu) Co., Ltd., Jiang Su (CN); Delta Electronics, Inc., Taoyuan Hsien (TW)

( * ) Notice: Subject to any disclaimer, the term of this patent is extended or adjusted under 35 U.S.C. 154(b) by 413 days.

(21) Appl. No.: 13/071,933

(22) Filed: Mar. 25, 2011

(65) Prior Publication Data
US 2012/0044559 A1    Feb. 23, 2012

(30) Foreign Application Priority Data
Aug. 20, 2010  (CN) .............................. 201020507772

(51) Int. Cl.
*G02B 26/02*  (2006.01)
(52) U.S. Cl.
USPC ............................ 359/234; 359/230; 396/510
(58) Field of Classification Search
USPC .......... 359/227, 230, 233–236; 396/458–461, 396/493–502, 505–510
See application file for complete search history.

(56) References Cited

U.S. PATENT DOCUMENTS

| 3,059,555 | A | * | 10/1962 | Kromer et al. | ................. 396/214 |
| 4,047,807 | A | * | 9/1977 | Okano et al. | ................. 359/234 |
| 5,926,663 | A | | 7/1999 | Suzuki | |
| 6,161,966 | A | | 12/2000 | Chang et al. | |
| 6,701,076 | B2 | | 3/2004 | Tsai | |

FOREIGN PATENT DOCUMENTS

| TW | 351779 | 2/1999 |
| TW | 503339 | 9/2002 |
| TW | I310877 | 6/2009 |

\* cited by examiner

*Primary Examiner* — James Phan
(74) *Attorney, Agent, or Firm* — Muncy, Geissler, Olds & Lowe, PLLC (57) ABSTRACT

An aperture adjusting device is disclosed. The aperture adjusting device includes a support frame, a gear ring, at least one blade, and a connector. The support frame includes an aperture, and a guiding slot. The gear ring is rotatably disposed on a first side of the support frame. The blade is swingably disposed on a second side of the support frame, and used to partially cover the aperture. The connector is fixed to the gear ring, and passes through the guiding slot to connect with the blade. The gear ring is adapted to rotate to make the connector move along the guiding slot to drive the blade to swing.

14 Claims, 8 Drawing Sheets

APERTURE ADJUSTING DEVICE

This application claims priority to China Patent Application No. 201020507772.1 filed on Aug. 20, 2010.

CROSS-REFERENCES TO RELATED APPLICATIONS

Not applicable.

BACKGROUND OF THE INVENTION

1. Field of the Invention

The present invention provides an aperture adjusting device and more particularly, to an aperture adjusting device with a gear ring.

2. Descriptions of the Related Art

Figure 1:
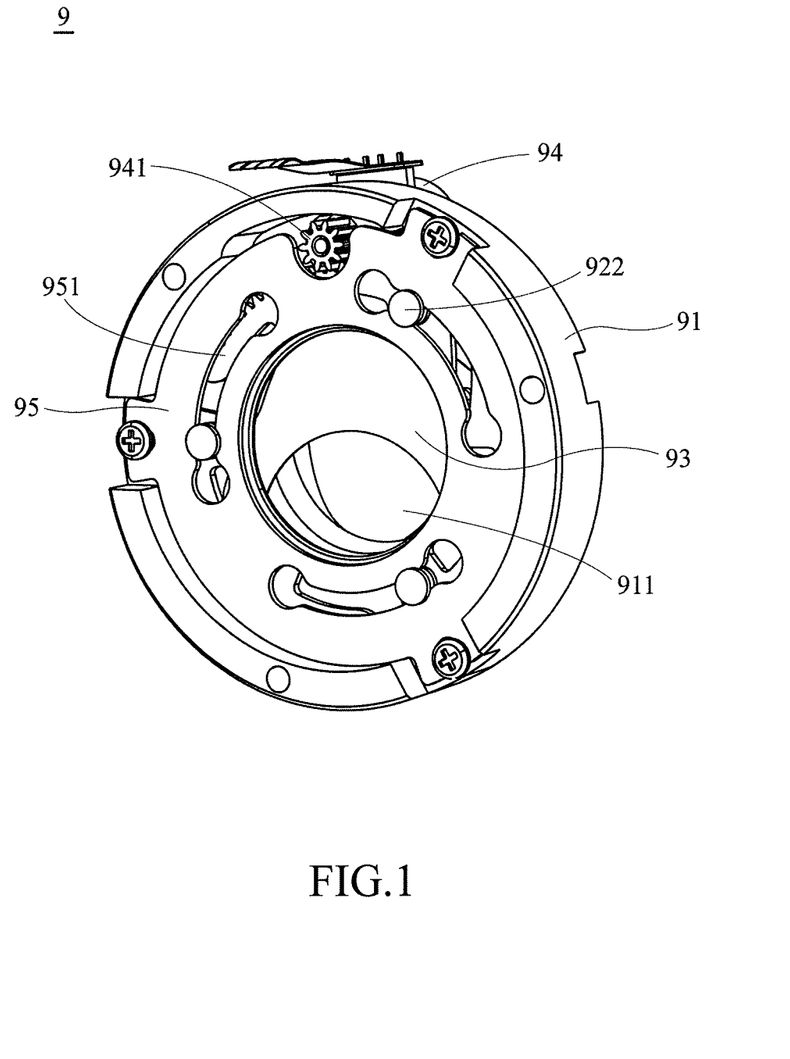
FIG. 1 is an assembly view of a conventional aperture adjusting device.
Figure 2:
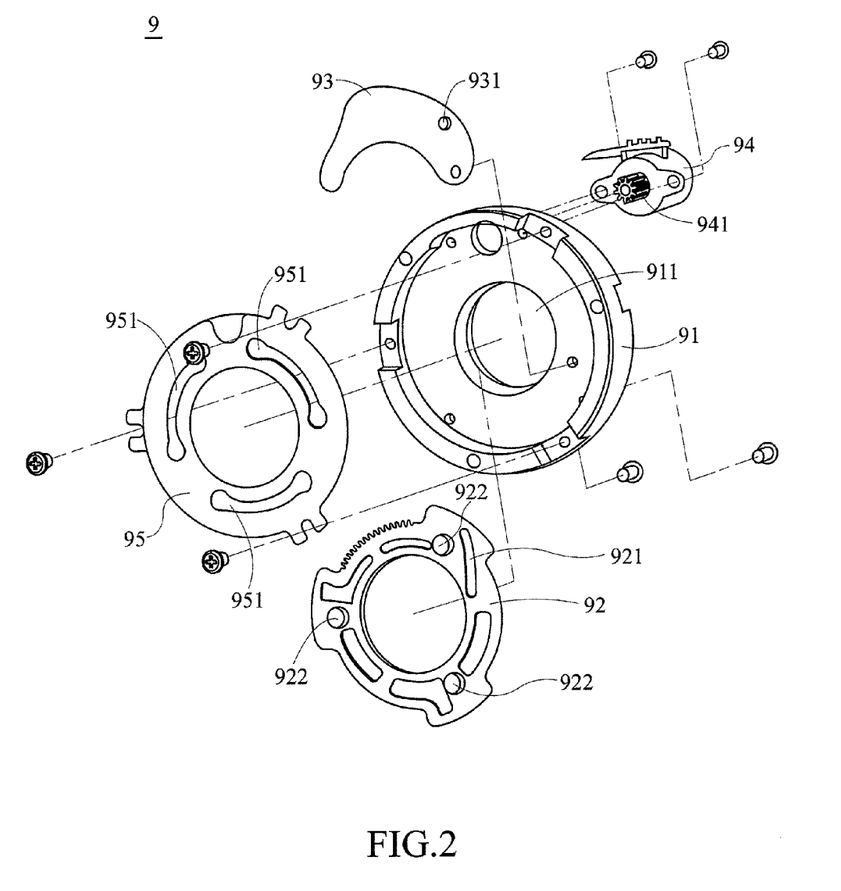
FIG. 2 is an exploded view of the conventional aperture adjusting device.

In reference to FIGS. 1 and 2, a conventional aperture adjusting device 9 is shown therein. The aperture adjusting device 9 comprises a frame 91, a gear ring 92, a blade 93, a step motor 94 and a cover plate 95.

The gear ring 92 has a guiding slot 921 and is suspended from the cover plate 95 to rotate through a plurality of shafts 922 that are slidable in a plurality of grooves 951 of the cover plate 95 respectively. The blade 93 is swingably connected to the frame 91 and partially covers the aperture 911 of the frame 91. Additionally, the blade 93 has a boss 931 extending into the guiding slot 921 of the gear ring 92. The step motor 94 and the cover plate 95 are fixed to the frame 91, and the driving gear 941 of the step motor 94 engages with the gear ring 92.

When the step motor 94 rotates, the driving gear 941 and the gear ring 92 are driven to rotate. As the gear ring 92 rotates, the boss 931 located in the guiding slot 921 will be pushed by the gear ring 92 to force the blade 93 to swing with respect to the frame 91. As the blade 93 swings to a greater angle, the area of the aperture 911 that is covered by the blade 93 becomes increasingly larger. The ratio of the area of the aperture 911 that is covered by the blade 93 to the original area of the aperture 911 may be called the "covering ratio".

Accordingly, by controlling the amount of rotation (i.e., the number of rotation steps) of the step motor 94, the covering ratio of the aperture 911 can be controlled.

It can be known from the above descriptions that although the conventional aperture adjusting device 9 can smoothly adjust the aperture, there are still some shortcomings, which will be discussed as follows:

1. The swingable range of the blade 93 is limited by the length of the guiding slot 921. The longer the guiding slot 921 is, the larger the swingable range of the blade 93 and, thus, the larger the covering ratio of the aperture 911. However, since the teeth that engages the driving gear 941 of the step motor 94 with other elements including the shafts 922 for suspending the gear ring 92 from the cover plate 95 must be provided on the gear ring 92, there is not a sufficient amount of area to extend the guiding slot 921. Consequently, it is difficult to improve the covering ratio of the aperture 911.

2. To finely control the covering ratio, the adjusting increment of the covering ratio shall be made to be small; that is, it is necessary to reduce the increment of the rotation angle of the gear ring 92 caused by each rotation step of the step motor 94. The larger the rotational speed ratio of the driving gear 941 to the gear ring 92 is, the smaller the increment of the rotation angle of the gear ring 92 caused by each rotation step of the step motor 94. In addition, the increment of the swinging angle of the blade 93 will also be smaller. Correspondingly, the adjusting increment of the covering ratio is small, which is beneficial to finely control the amount of incoming light. However, there is a limitation on the extent to which the number of teeth of the driving gear 941 can be reduced to increase the rotational speed ratio, so it is difficult to improve the rotational speed ratio of the driving gear 941 to the gear ring 92. Furthermore, reducing the rotation angle per step of the step motor 94 to reduce the increment of rotation angle of the gear ring 92 caused by each rotation step of the step motor 94 is also limited by the specification of the step motor 94. Therefore, the adjusting increment of the covering ratio of the aperture 911 of the conventional aperture adjusting device 9 is relatively large, which is unfavorable for the fine control of the amount of incoming light.

3. The gear ring 92 hangs from the cover plate 95, so hanging shafts 922 are needed for the gear ring 92. However, the hanging shafts 922 are difficult to manufacture and require a high manufacturing precision for the gear ring 92 to rotate smoothly. This is unfavorable for mass production. Furthermore, the frictional force between the hanging shafts 922 and the cover plate 95 is relatively large, which necessitates a large torsional force to drive the gear ring 92.

4. Because the hanging shafts 922 and the guiding slot 921 need to be disposed in the gear ring 92, the gear ring 92 is large in size and also heavy in weight. As a consequence, the torsional force required to drive the gear ring 92 must be increased.

In view of this, there is an urgent need in the art to provide an aperture adjusting device that can improve the aforesaid shortcomings.

SUMMARY OF THE INVENTION

An objective of the present invention is to provide an aperture adjusting device, which is provided with a long guiding slot to enlarge a swingable range of a blade to improve the covering ratio of the aperture.

An embodiment of the present invention discloses an aperture adjusting device, comprising a support frame, a gear ring, at least one blade and a connector. The support frame comprises an aperture and a first guiding slot, and has a first side and a second side opposite the first side. The gear ring is rotatably disposed on the first side of the support frame. The at least one blade is swingably disposed on the second side of the support frame to partially cover the aperture. The connector is fixed to the gear ring and passes through the first guiding slot to connect with the at least one blade. The gear ring is adapted to rotate to make the connector move along the first guiding slot to drive the at least one blade to swing.

Thereby, the support frame of this embodiment the present invention can provide a large area for extending the first guiding slot, so that both the rotary range of the gear ring and the swingable range of the blade are enlarged to result in an increased covering ratio of the aperture. Additionally, the need of disposing a guiding slot in the gear ring is eliminated, so that both the size and the weight of the gear ring can be reduced to reduce the torsional force required to drive the gear ring.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 3:
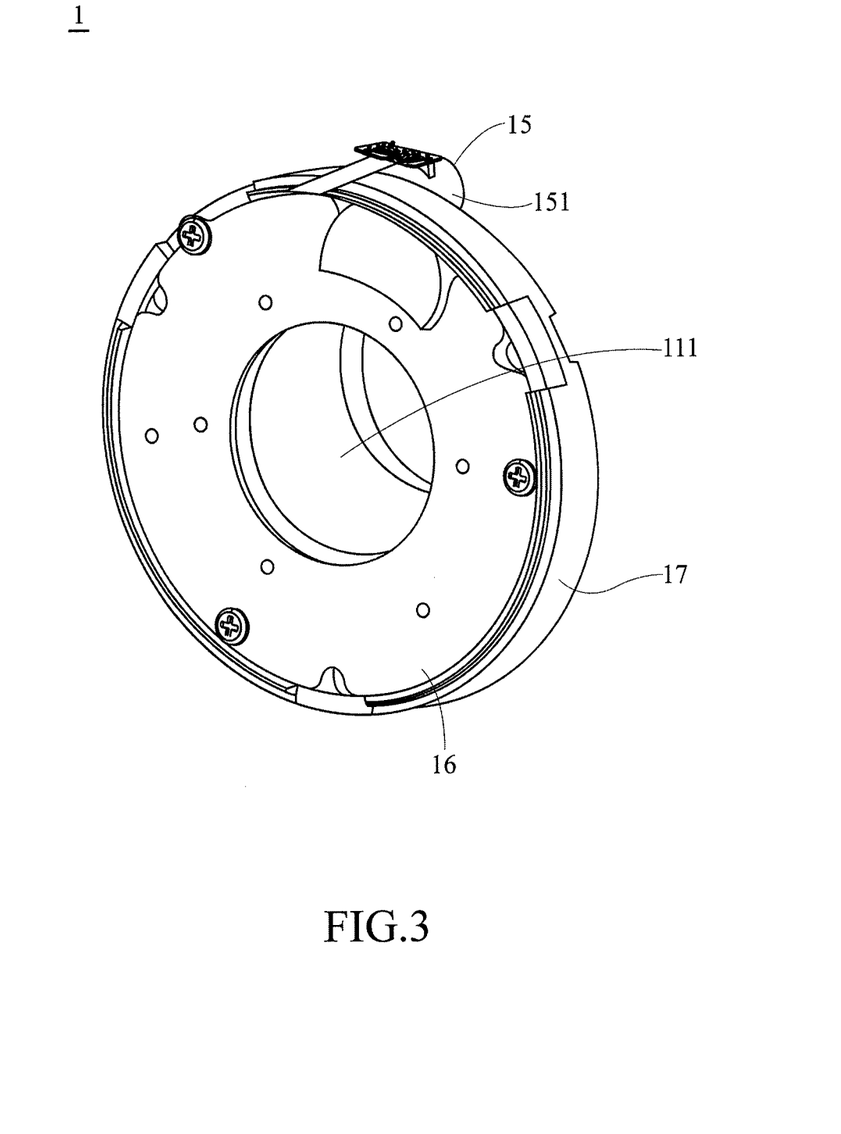
FIG. 3 is an assembly view of a preferred embodiment of an aperture adjusting device according to the present invention.
Figure 4:
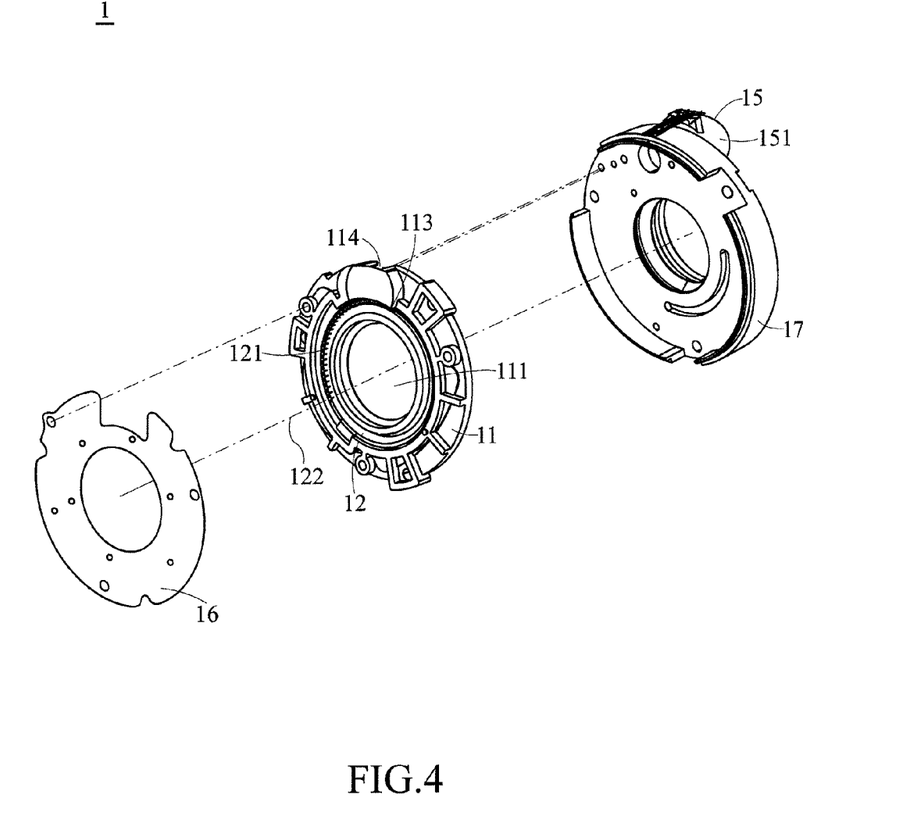
FIG. 4 is an exploded view of the preferred embodiment of the aperture adjusting device according to the present invention.
Figure 5:
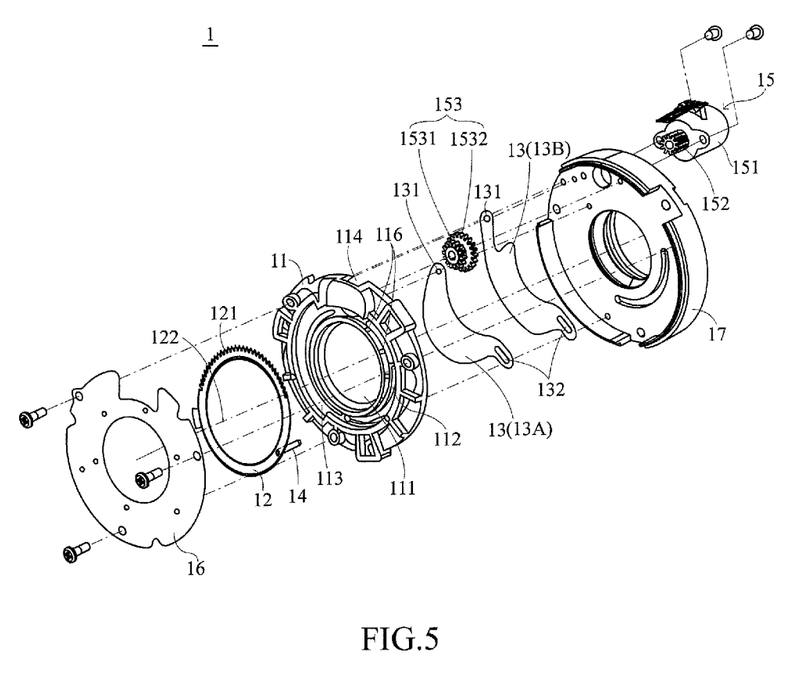
FIG. 5 is another exploded view of the preferred embodiment of the aperture adjusting device according to the present invention.

Referring to FIG. 3 through FIG. 5, a preferred embodiment of the aperture adjusting device 1 of the present invention is shown therein. The aperture adjusting device 1 may be installed in a projector (not shown) to adjust brightness of light projected by the projector. The aperture adjusting device 1 comprises a support frame 11, a gear ring 12, at least one blade 13, a connector 14 and a driving module 15.

Figure 6:
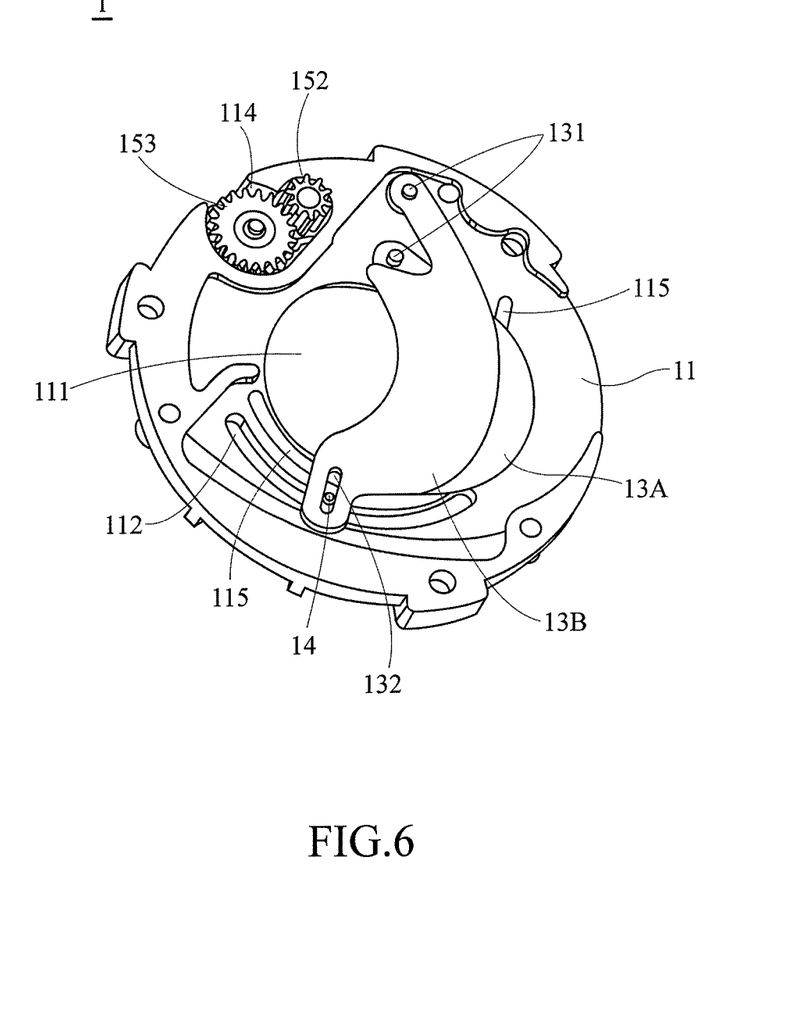
FIG. 6 is an assembly view of some elements in the preferred embodiment of the aperture adjusting device according to the present invention.

Referring to an embodiment shown in FIG. 5 and FIG. 6, the support frame 11 may be a disc-shaped structure and have a first side and a second side opposite to the first side. Additionally, the support frame 11 comprises an aperture 111, a first guiding slot 112, a ring-shaped recess 113, a receiving space 114, a rib 115 and a plurality of protrusions 116.

The aperture 111 may be located at the center of the support frame 11, and the first guiding slot 112 is located at the periphery of the aperture 111 and extends along the circumference of the aperture 111. Both the aperture 111 and the first guiding slot 112 axially extend through the support frame 11. The ring-shaped recess 113 is disposed at the first side of the support frame 11 and surrounds the aperture 111, and the first guiding slot 112 is located within the ring-shaped recess 113. The receiving space 114 is located at the periphery of the support frame 11 and axially extends through the support frame 11. Further, the receiving space 114 communicates with the ring-shaped recess 113. The rib 115, which may be a stripe-like structure, is disposed at the second side of the support frame 11 and extends along the circumference of the aperture 111. The protrusions 116, which may be of a semispherical or semi-cylindrical structure, are disposed within the ring-shaped recess 113, and distributed at equal intervals along the circumference of the aperture 111.

The gear ring 12 may be substantially ring shaped, with a plurality of teeth 121 on an outer annular surface thereof. The gear ring 12 may be rotatably disposed at the first side of the support frame 11. The gear ring 12 rotates along a rotary axis 122 which may pass through the axis of the aperture 111, so practically the gear ring 12 can rotate around the axis of the aperture 111. Further, the gear ring 12 is disposed in the ring-shaped recess 113 to limit radial movement of the gear ring 12 relative to the aperture 111, as shown in FIG. 4. The inner annular surface of the gear ring 12 makes contact with the protrusions 116 to form a point-to-surface contact or a line-to-surface contact, so the contact area between the gear ring 12 and the support frame 11 is small. As a result, the frictional force generated when the gear ring 12 rotates with respect to the support frame 11 is small.

It is worth noting that, there is no limitation on materials of the support frame 11 and the gear ring 12. In practical applications, the support frame 11 of the present invention may be injection molded from a plastic material, and the gear ring 12 may be made of a metal (e.g., copper). Preferably, the support frame 11 is made of a self-lubricating material, so the gear ring 12 can smoothly rotate with respect to the support frame 11 without need of application of any lubricant.

At least one blade 13 may be substantially shaped like a meniscus and is used to partially cover the aperture 111. In an embodiment, the blade 13 comprises a first blade 13A and a second blade 13B overlapping each other. Here, the first blade 13A makes contact with the rib 115 to reduce the contact area between the first blade 13A and the support frame 11 so that the frictional force can be reduced to facilitate swinging of the first blade 13A. Each of the blades 13A and 13B has a shaft 131 and a second guiding slot 132. A distance from the second guiding slot 132 of the first blade 13A to the shaft 131 is shorter than a distance from the second guiding slot 132 of the second blade 13B to the shaft 131, and the shaft 131 of the first blade 13A is closer to the rotary axis 122 of the gear ring 12 than the shaft 131 of the second blade 13B. The second guiding slot 132 further extends along an extending direction, which may pass through the shafts 131 of the blades 13.

Figure 7:
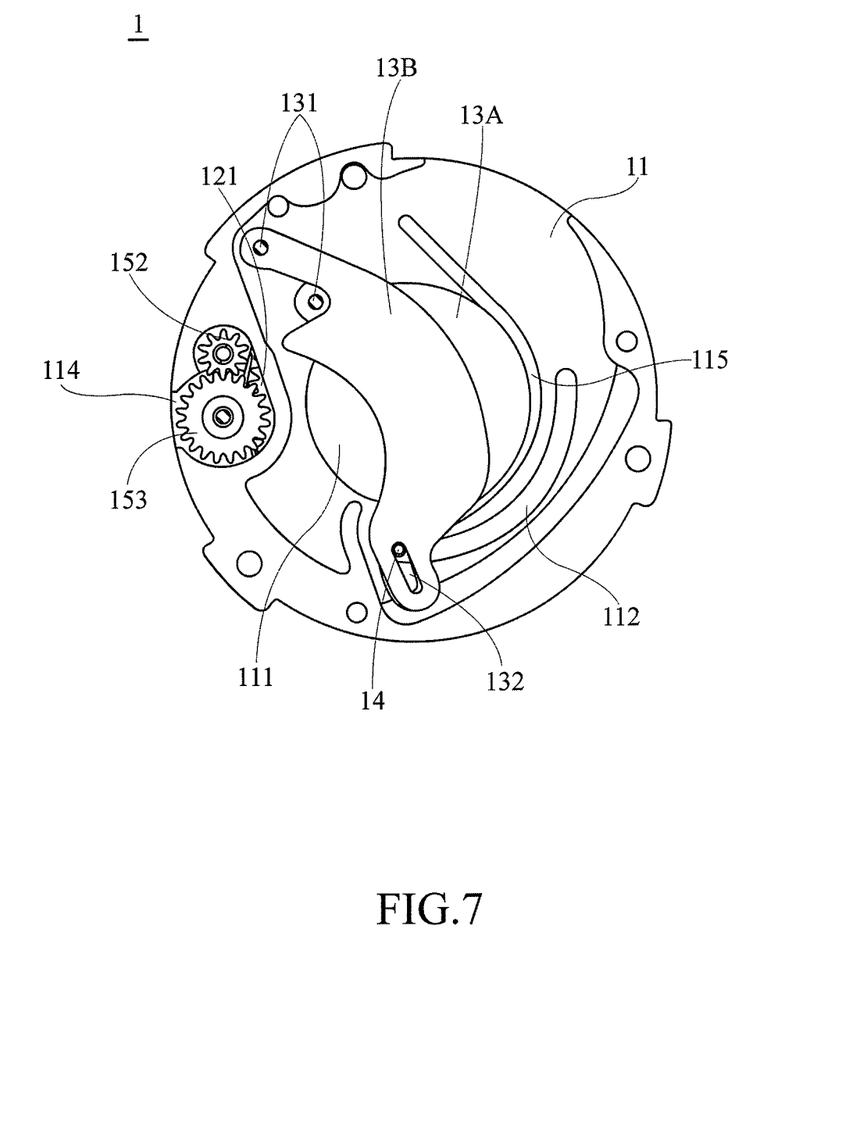
FIG. 7 is a schematic view illustrating a status where the minimum aperture is presented in the preferred embodiment of the aperture adjusting device according to the present invention.
Figure 8:
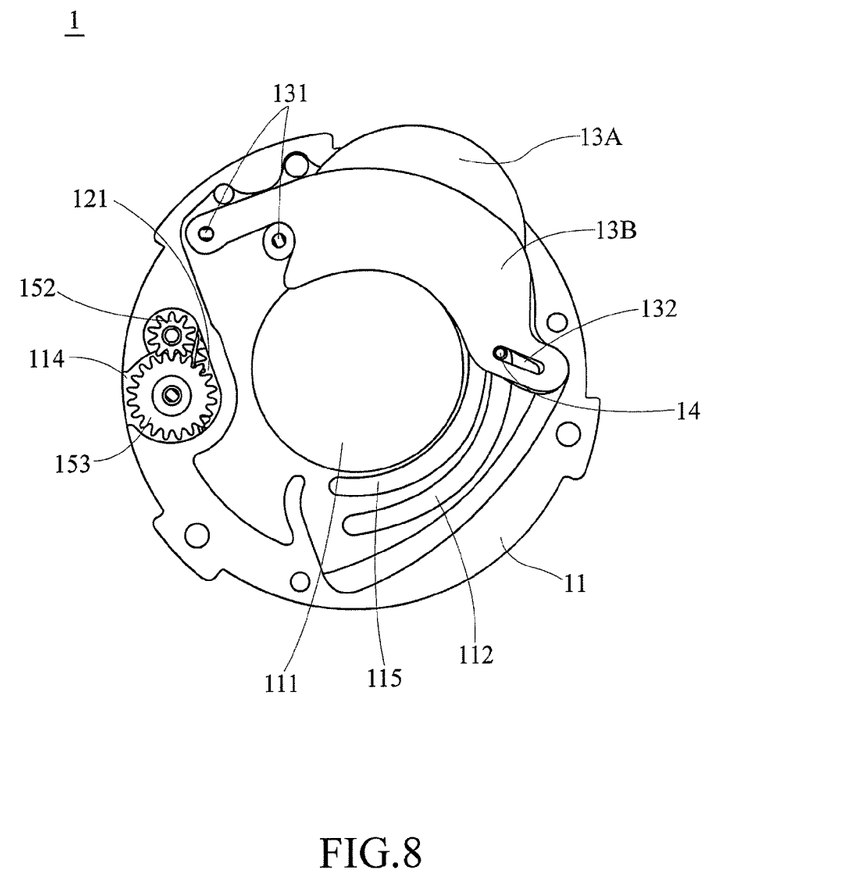
FIG. 8 is a schematic view illustrating a status where the maximum aperture is presented in the preferred embodiment of the aperture adjusting device according to the present invention.

Referring to an embodiment shown in FIG. 7 and FIG. 8, the first blade 13A and the second blade 13B are swingably disposed at the second side of the support frame 11, and the shafts 131 and the second guiding slots 132 are located substantially at two sides of the aperture 111 along a radical direction thereof respectively. The first blade 13A and the second blade 13B swing around the respective shafts 131 with respect to the support frame 11 respectively, and the second guiding slots 132 extend in a direction that passes through the rotary axis 122 of the gear ring 12 (or an axis of the aperture 111) to avoid interference arising when the connector 14 drives the first blade 13A and the second blade 13B. Furthermore, as viewed along the axial direction of the aperture 111, the second guiding slots 132 and the first guiding slot 112 partially overlap each other; and as the swinging angle of the first blade 13A and the second blade 13B varies, the covered area (i.e., the covering ratio) of the aperture 111 will vary correspondingly.

The blades 13 (i.e., the first blade 13A and the second blade 13B) may be made of a metal (e.g., copper). Because the support frame 11 is preferably made of a self-lubricating material, the blades 13 can rotate smoothly around the support frame 11 without need of adding any lubricant.

The connector 14 may be a cylindrical body and fixed to the gear ring 12 to rotate along with the gear ring 12. The connector 14 passes through the first guiding slot 112, and when the gear ring 12 rotates, the connector 14 moves along the first guiding slot 112. As shown in FIG. 7 and FIG. 8, when the connector 14 moves to an end of the first guiding slot 112, the gear ring 12 will fail to rotate any further. It can be known from this that, the length of the first guiding slot 112 can limit the rotary range of the gear ring 12; more specifically, the greater the length of the first guiding slot 112 (i.e., the distance between two ends thereof), the larger the rotary range. The present invention has the first guiding slot 112 disposed in the support frame 11 so that there is ample space for the first guiding slot 112 to extend to enlarge the rotary range of the gear ring 12. In an embodiment, the rotary range of the gear ring 12 is substantially 100°.

After passing through the first guiding slot 112, the connector 14 further connects with at least one blade 13 (i.e., the first blade 13A and the second blade 13B). In this way, when moving along the first guiding slot 112, the connector 14 can drive the first blade 13A and the second blade 13B to swing. In more detail, the connector 14 connects with the first blade 13A and the second blade 13B by extending into the second guiding slot 132 of the first blade 13A and the second guiding slot 132 of the second blade 13B. The connector 14 can move within the second guiding slots 132 of the first blade 13A and the second blade 13B simultaneously and force the first blade 13A and the second blade 13B to swing.

As shown in FIG. 7 and FIG. 8, because a distance from the connector 14 to the shaft 131 of the first blade 13A is different from a distance from the connector 14 to the shaft 131 of the second blade 13B, the rotary (swingable) range of the first blade 13A is also different from that of the second blade 13B. In an embodiment, when the gear ring 12 has a rotary range of about 100°, the first blade 13A has a rotary range of substantially 52° and the second blade 13B has a rotary range of substantially 40.5°. As both the swingable range and the size are different for the first blade 13A and the second blade 13B, the first blade 13A and the second blade 13B, when swinging, can cover different portions of the aperture 111 respectively, thus improving the covering ratio of the aperture 111. In an embodiment, the covering ratio of the aperture 111 can be up to 80%.

As can be known from the above description, when the number of the blades 13 is increased, the covering ratio of the aperture 111 can be improved. Hence, when it is needed to improve the covering ratio of the aperture 111, a third blade (not shown) may be superposed on the second blade 13B; on the other hand, when it is needed to decrease the covering ratio of the aperture 111, the second blade 13B may be removed, with only the first blade 13A being left.

The driving module 15 can generate a rotational movement, and an amount of the rotational movement can be controlled. The driving module 15 connects with the gear ring 12 to drive the gear ring to rotate so that the connector 14 moves along the first guiding slot 112 to drive the blades 13 (i.e., the first blade 13A and the second blade 13B) to swing. The driving module 15 can control the rotation angle of the gear ring 12 so that the covering ratio of the aperture 111 can be adjusted by controlling the swinging angle of the blades 13.

In an embodiment, the driving module 15 may comprise a motor 151, a driving gear 153 and a double-level gear 153. The motor 151 may be a motor capable of controlling the rotation angle of its shaft, for example, a step motor or a servo motor. The driving gear 152 is fixed to the motor 151 so as to be driven by the motor 151 to rotate around the shaft of the motor 151. The driving gear 152 and the double-level gear 153 are both located within the receiving space 114 of the support frame 11. The double-level gear 153 has a first level (gear) 1531 and a second level (gear) 1532, with a tooth number of the first level 1531 being fewer than that of the second level 1532. The first level 1531 extends into the ring-shaped recess 113 of the support frame 11 and engages with the teeth 121 of the gear ring 12; and the second level 1532 engages with the driving gear 152.

In this way, the rotational kinetic energy of the motor 151 can be transmitted to the gear ring 12 via the driving gear 152 and the double-level gear 153 to drive the gear ring 12 to rotate. Furthermore, because of the double-level gear 153, the rotation speed ratio of the gear ring 12 to the driving gear 152 can be up to 1:11 in an embodiment. Accordingly, in an embodiment, when the minimum rotation angle increment of the motor 151 is 20°, the minimum rotation angle increment of the gear ring is 1.82°. By dividing the rotary range 100° of the gear ring 12 by 1.82°, it can be known that the rotary range of the gear ring 12 may be divided into about 55 segments, which means that the swingable range of the first blade 13A and the second blade 13B may also be divided into about 55 segments. In other words, the covering ratio of the aperture 111 may be adjusted by about 55 segments, so the adjusting increment of the covering ratio is relatively small, which facilitates fine tuning of the light amount passing through the aperture 111.

It is worth noting that, the tooth number of the first level 1531 and that of the second level 1532 of the double-level gear 153 may be adjusted to adapt the rotation speed ratio of the gear ring 12 to the driving gear 152 to different applications. Therefore, the increasing of the rotation speed ratio won't result in the driving gear 152 to have a too small tooth number or a too small tooth profile which is not easily manufactured.

The aperture adjusting device 1 may further comprise a cover plate 16 and a housing 17. The cover plate 16 is fixed at the first side of the support frame 11, and the gear ring 12 is located between the cover plate 16 and the support frame 11. The gear ring 12 needs not to be suspended from the cover plate 16 as in the conventional aperture adjusting device 9, but instead is directly accommodated in the ring-shaped recess 113 of the self-lubricating support frame 11. The cover plate 16 can limit axial movement of the gear ring 12 to prevent detachment of the gear ring 12 from the support frame 11.

The housing 17 is fixed at the second side of the support frame 11, and the at least one blade 13, the driving gear 152 and the double-level gear 153 are all located between the housing 17 and the support frame 11. The motor 151 is fixed to an outer edge (surface) of the housing 17. The housing 17 can limit axial movement of the at least one blade 13 to prevent detachment of the at least one blade 13 from the support frame 11.

Thus, the aperture adjusting device 1 has been described above. The aperture adjusting device 1 has at least one of the following features:

1. No guiding slot or shaft is needed on the gear ring 12, so the gear ring 12 is made to have a small size and light weight, thus reducing the torsional force required to drive the gear ring 12. Additionally, the gear ring 12 is easy to manufacture, so the production cost is lowered.
2. As the support frame 11 can provide a large area for the first guiding slot 112 to extend, the rotary ranges of the gear ring 12 and the at least one blade 13 are enlarged to result in an increased covering ratio of the aperture 111.
3. The support frame 11 may be made of a plastic material, so it can be fabricated through injection molding or the like to lower the production cost. Furthermore, the support frame 11 may be self-lubricating, so the gear ring 12 and the at least one blade 13 are allowed to rotate freely without need of application of any lubricant, thereby reducing the torsional force required to drive them.
4. The double-level gear 153 can significantly increase the rotation speed ratio between the driving gear 152 and the gear ring 12 to increase the number of segments of adjusting the covering ratio of the aperture 111.
5. The first blade 13A and the second blade 13B (or more blades 13) cover different portions of the aperture 111, so the covering ratio of the aperture 111 gets increased.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An aperture adjusting device, comprising:
   a support frame including an aperture and a first guiding slot and having a first side and a second side opposing to the first side;
   a gear ring rotatably disposed at the first side of the support frame;
   at least one blade swingably disposed at the second side of the support frame to partially cover the aperture; and
   a connector fixed to the gear ring and passing through the first guiding slot to connect with the at least one blade;
   wherein the gear ring is adapted to rotate to make the connector move along the first guiding slot to drive the at least one blade to swing.

2. The aperture adjusting device claimed in claim 1, wherein the at least one blade has a second guiding slot, and the connector extends into the second guiding slot to move in the second guiding slot to drive the at least one blade to swing.

3. The aperture adjusting device claimed in claim 2, wherein the at least one blade has a shaft, and the at least one blade swings relatively to the support frame along the shaft.

4. The aperture adjusting device claimed in claim 3, wherein the gear ring rotates along a rotary axis, the second guiding slot extends along an extending direction, and the extending direction passes through the rotary axis of the gear ring and the shaft of the at least one blade.

5. The aperture adjusting device claimed in claim 4, wherein the at least one blade includes a first blade, and a second blade overlapping each other, the shaft of the first blade is closer to the rotary axis of the gear ring than the shaft of the second blade, and the connector extends into the second guiding slot of the first blade and the second guiding slot of the second blade.

6. The aperture adjusting device claimed in claim 5, wherein the support frame includes a rib, and the rib contacts the first blade.

7. The aperture adjusting device claimed in claim 5, wherein a rotary range of the gear ring is 100 degrees substantially; a rotary range of the first blade is 52 degrees substantially, and a rotary range of the second blade is 40.5 degrees substantially.

8. The aperture adjusting device claimed in claim 1, wherein the aperture adjusting device further comprises a driving module, the driving module includes a motor, a double-level gear and a driving gear, the driving gear is fixed to the motor, the double-level gear has a first level and a second level engaging with the gear ring and the driving gear respectively, and a tooth number of the first level is fewer than a tooth number of the second level.

9. The aperture adjusting device claimed in claim 8, wherein the support frame has a receiving space, and the double-level gear and the driving gear are located in the receiving space.

10. The aperture adjusting device claimed in claim 8, wherein a rotation speed ratio of the gear ring to the driving gear is 1 to 11.

11. The aperture adjusting device claimed in claim 1, wherein the support frame has a ring-shaped recess surrounding the aperture, the first guiding slot is located in the ring-shaped recess, and the gear ring is disposed within the ring-shaped recess.

12. The aperture adjusting device claimed in claim 11, wherein the support frame includes a plurality of protrusions disposed in the ring-shaped recess, and the protrusions contact the gear ring.

13. The aperture adjusting device claimed in claim 1, wherein the support frame is self-lubricating.

14. The aperture adjusting device claimed in claim 1, wherein the aperture adjusting device further comprises a cover plate and a housing both fixed with the support frame, the at least one blade is located between the housing and the support frame, and the gear ring is located between the cover plate and the support frame.

* * * * *